US008688454B2

(12) United States Patent
Zheng

(10) Patent No.: US 8,688,454 B2
(45) Date of Patent: Apr. 1, 2014

(54) METHOD AND APPARATUS FOR ADAPTING A LANGUAGE MODEL IN RESPONSE TO ERROR CORRECTION

(75) Inventor: Jing Zheng, San Jose, CA (US)

(73) Assignee: SRI International, Menlo Park, CA (US)

( * ) Notice: Subject to any disclaimer, the term of this patent is extended or adjusted under 35 U.S.C. 154(b) by 279 days.

(21) Appl. No.: 13/176,925

(22) Filed: Jul. 6, 2011

(65) Prior Publication Data

US 2013/0013311 A1    Jan. 10, 2013

(51) Int. Cl.
*G10L 15/18* (2013.01)
*G10L 15/06* (2013.01)

(52) U.S. Cl.
USPC .......................................... 704/257; 704/243

(58) Field of Classification Search
None
See application file for complete search history.

(56) References Cited

U.S. PATENT DOCUMENTS

| 5,692,097 | A * | 11/1997 | Yamada et al. ............... 704/241 |
| 6,064,957 | A * | 5/2000 | Brandow et al. ............. 704/235 |
| 6,167,377 | A * | 12/2000 | Gillick et al. ................. 704/240 |
| 7,124,080 | B2 * | 10/2006 | Chen et al. .................... 704/244 |
| 7,454,344 | B2 * | 11/2008 | Ramsey ........................ 704/257 |
| 7,542,907 | B2 * | 6/2009 | Epstein et al. ................ 704/275 |
| 7,774,196 | B2 * | 8/2010 | Cote et al. ......................... 704/9 |
| 7,778,830 | B2 * | 8/2010 | Davis et al. .................. 704/235 |
| 7,813,926 | B2 * | 10/2010 | Wang et al. .................... 704/245 |
| 7,930,181 | B1 * | 4/2011 | Goffin et al. ............... 704/256.7 |
| 8,204,739 | B2 * | 6/2012 | Waibel et al. .................. 704/10 |
| 8,229,743 | B2 * | 7/2012 | Carter et al. .................. 704/251 |
| 8,239,200 | B1 * | 8/2012 | Brants .......................... 704/257 |
| 2002/0087309 | A1 * | 7/2002 | Lee et al. ...................... 704/240 |
| 2010/0094629 | A1 * | 4/2010 | Emori et al. .................. 704/244 |
| 2010/0104087 | A1 * | 4/2010 | Byrd et al. ............... 379/265.09 |
| 2010/0250251 | A1 * | 9/2010 | Ohtsuki et al. ............... 704/243 |
| 2012/0029903 | A1 * | 2/2012 | Precoda et al. .................. 704/2 |
| 2012/0316877 | A1 * | 12/2012 | Zweig et al. .................. 704/251 |

OTHER PUBLICATIONS

Vergyri, D.; Stolcke, A.; Tur, G., "Exploiting user feedback for language model adaptation in meeting recognition," Acoustics, Speech and Signal Processing, 2009. ICASSP 2009. IEEE International Conference on , vol., no., pp. 4737,4740, Apr. 19-24, 2009.*

Berger, A.; Miller, R., "Just-in-time language modelling," Acoustics, Speech and Signal Processing, 1998. Proceedings of the 1998 IEEE International Conference on , vol. 2, no., pp. 705,708 vol. 2, May 12-15, 1998.*

Ringger, E.K.; Allen, J.F., "Error correction via a post-processor for continuous speech recognition," Acoustics, Speech, and Signal Processing, 1996. ICASSP-96. Conference Proceedings., 1996 IEEE International Conference on , vol. 1, no., pp. 427,430 vol. 1, May 7-10, 1996.*

* cited by examiner

*Primary Examiner* — Brian Albertalli

(57) ABSTRACT

The present invention relates to a method and apparatus for adapting a language model in response to error correction. One embodiment of a method for processing an input signal including human language includes receiving the input signal and applying a statistical language model combined with a separate, corrective language model to the input signal in order to produce a processing result.

17 Claims, 3 Drawing Sheets

METHOD AND APPARATUS FOR ADAPTING A LANGUAGE MODEL IN RESPONSE TO ERROR CORRECTION

FIELD OF THE INVENTION

The present invention relates generally to speech processing, and relates more particularly to human language technologies (HLTs). In further embodiments, the present invention may apply to other types of recognition applications, including handwriting recognition and optical character recognition.

BACKGROUND OF THE DISCLOSURE

Human language technologies (HLTs) such as automatic speech recognition (ASR), machine translation, and the like, typically cannot achieve one hundred percent accuracy due to technical limitations and/or specific user needs. The errors that do occur, especially those that repeat, can significantly affect the user experience.

SUMMARY OF THE INVENTION

The present invention relates to a method and apparatus for adapting a language model in response to error correction. One embodiment of a method for processing an input signal including human language includes receiving the input signal and applying a statistical language model combined with a separate, corrective language model to the input signal in order to produce a processing result.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for adapting a language model in response to error correction. Embodiments of the present invention provide an interface that allows a user to provide corrections responsive to the output of a human language technology (HLT)-based application. The HLT-based application learns from the user-provided corrections, thereby reducing the likelihood of the same errors occurring in future outputs. In one embodiment, the learning involves updating the language models used by the HLT-based application in a manner responsive to the user-provided corrections. In particular, one embodiment generates and stores a corrective language model that is separate from the statistical language model to which it applies. In operation, the statistical language model and the corrective language model are combined to perform the HLT-based application.

Figure 1:
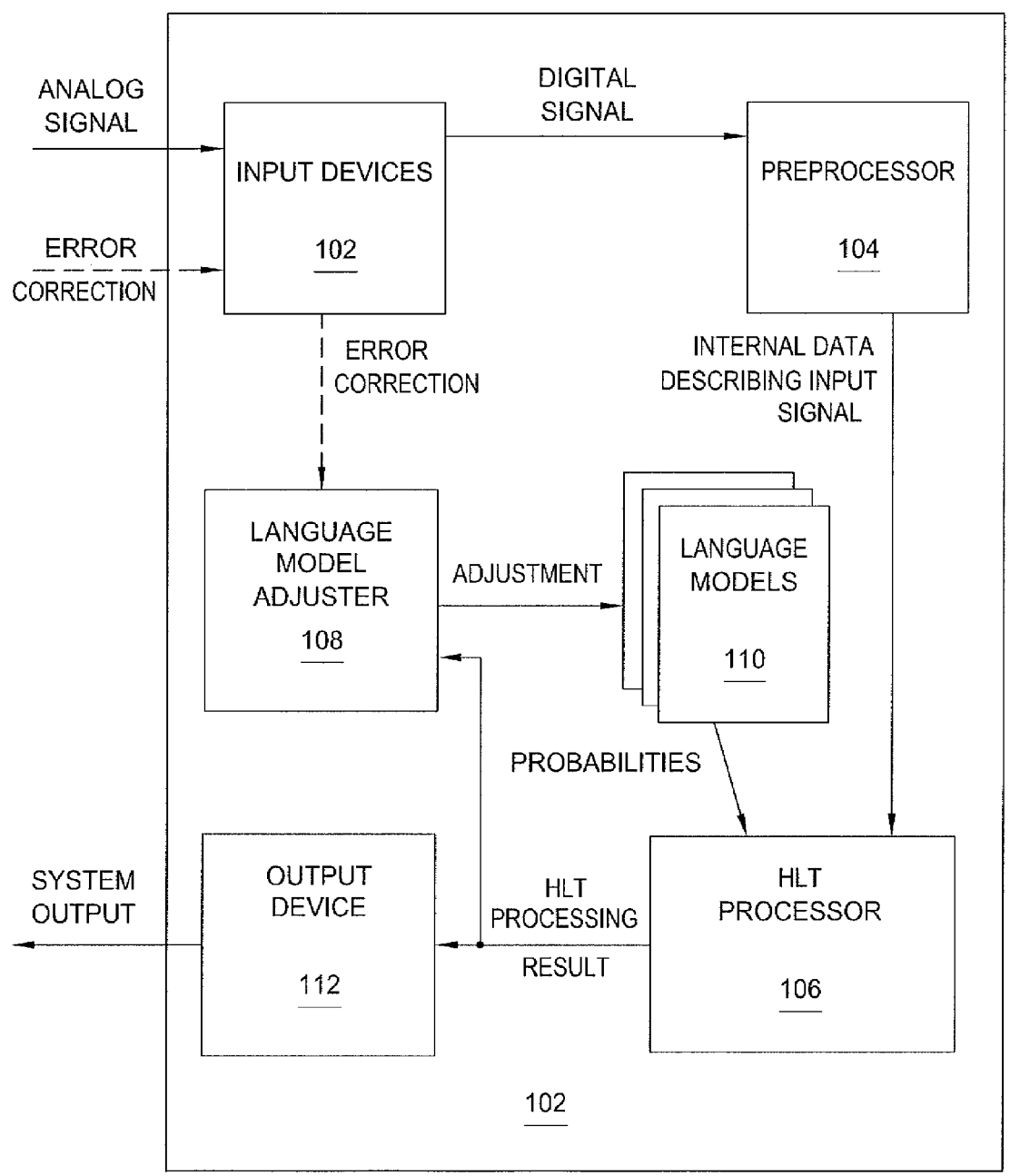
FIG. 1 is a schematic diagram illustrating one embodiment of a system for adapting a language model in response to error correction, according to the present invention.

FIG. 1 is a schematic diagram illustrating one embodiment of a system 100 for adapting a language model in response to error correction, according to the present invention. The system 100 may be a subsystem of an HLT-based system or may be a stand-alone system. In particular, the system 100 is configured to process analog signals including speech samples (e.g., user utterances), textual inputs (e.g., handwriting or character samples), and the like, and to adapt such processing responsive to user feedback (e.g., error correction). The adaptations may be used to improve the processing of future inputs.

As illustrated, the system 100 comprises one or more input devices 102, a preprocessor 104, a human language technology (HLT) processor 106, a language model adjuster 108, a plurality of language models 110, and an output device 112. In alternative embodiments, one or more of these components may be optional. In further embodiments still, two or more of these components may be implemented as a single component.

The input device 102 receives input analog signals such as speech samples (e.g., user utterances, textual inputs (e.g., handwriting or character samples), and the like. These analog signals comprise data to be processed by the system 100. In addition, the input devices 102 receive user feedback (e.g., error correction) responsive to outputs of the system 100. Thus, the input devices 102 may include one or more of: a keyboard, a stylus, a mouse, a microphone, a camera, or a network interface (which allows the system 100 to receive input from remote devices). In one embodiment, the analog signals to be processed and the user feedback responsive to the system outputs are received via separate input devices 102. For example, a microphone may receive a speech sample for processing, while user feedback is subsequently received via mouse and/or keyboard. In one embodiment, the input device digitizes the analog signals to produce digital signals. In another embodiment, the input signal is received in digital form; thus, digitization is not necessary in this case.

The input devices are coupled to the preprocessor 104, which receives the digital signals from the input device 102. The preprocessor 104 performs one or more preprocessing techniques on the digital signals, such as noise reduction, endpointing, skew correction, binarization, or the like. In an alternative embodiment, preprocessing may be performed on the analog signals before they are provided to the input device 102; in this case, the preprocessor 104 is not necessary. The preprocessor thus produces internal data describing the input signals.

The preprocessor 104 is coupled to the HLT processor 106, which receives the internal data from the preprocessor 104. The HLT processor 106 processes the internal data in accordance with one or more HLT-based applications. Thus, the HLT processor 106 may comprise, for example, an automatic speech recognition (ASR) processor, a machine translator, an optical character recognition (OCR) processor, a handwriting recognition processor, or another device that processes human language. The HLT processor 106 is coupled to the plurality of language models 110, which are applied by the HLT processor 106 to process the internal data.

The plurality of language models 110 includes at least one statistical language model, which assigns probabilities to words or sequences of words (e.g., by means of probability distributions). Different statistical language models may be associated with different languages, contexts, and applications.

In addition, the plurality of language models 110 includes at least one corrective language model. The corrective language model stores data that allows the probabilities for at least some of the words or sequences of words contained within the statistical language models to be adjusted. In one embodiment, this data comprises an amount of an adjustment that should be made to a probability. Thus, the original statistical language models remain unaltered. In one embodiment, a separate corrective language model is stored for each user of the system 100. In one embodiment, the corrective language model does not use the same length of context as the statistical language models, and the probability differences given longer contexts are backed off to shorter contexts with a back off weight. This balances the ability to generalize the probability adjustments with the risk of over-adjustment.

The HLT processor 106 is also coupled to the output device 112 and delivers the HLT processing results to the output device 112. The output device 112 delivers the system output (e.g., processed speech samples) to a user or to another device or system. For example, if the HLT processor 106 is an ASR processor, the output device 112 would deliver a textual transcription of the speech sample to the user or device. Alternatively, if the HLT processor 106 is a machine translator, the output device 112 might deliver a textual or audio translation of the speech sample to the user or device. Thus, in one embodiment, the output device 112 comprises one or more of the following: a display, a speaker, a haptic device, or a network interface (which allows the system 100 to send outputs to a remote device).

The language model adjuster 108 is coupled to the input device 102 and also to the plurality of language models 110. The language model adjuster 108 receives user input from the input device 102 as well as the processing results from the HLT processor 106. As discussed above, the user input is responsive to the output of the system 100 and may include, for example, error corrections. The language model adjuster 108 computes a probability adjustment for one or more words in the language models 110, based on this user input. For example, if the user input corrects a mis-recognized word in the system output, the language model adjuster 108 may compute an adjustment that increases the probability of the correct word and decreases the probability of the incorrect word. These adjustments are stored in the corrective language model and help the system 100 to learn and to improve the quality of its future output.

Figure 2:
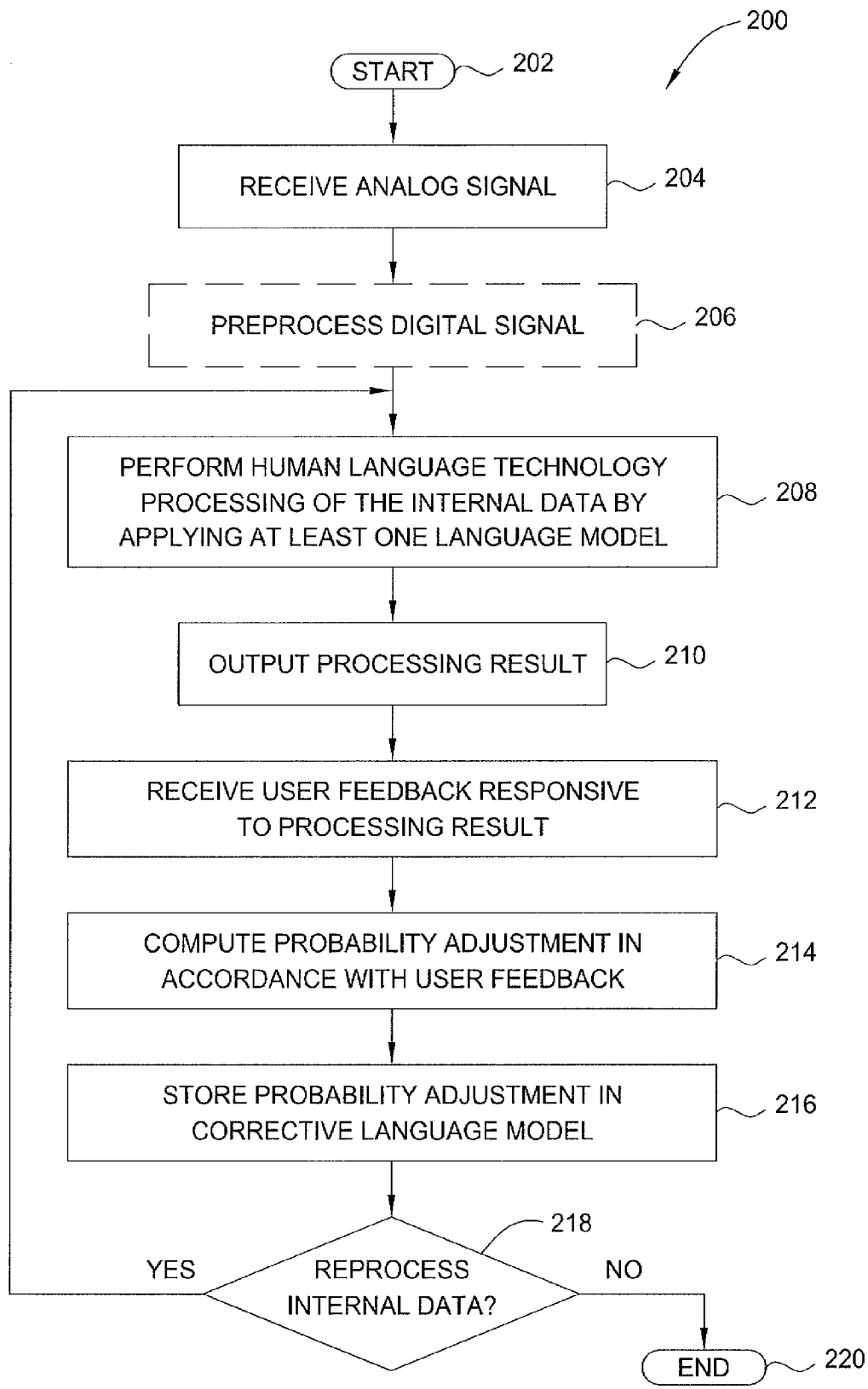
FIG. 2 is a flow diagram illustrating one embodiment of a method for adapting a language model in response to error correction, according to the present invention.

FIG. 2 is a flow diagram illustrating one embodiment of a method 200 for adapting a language model in response to error correction, according to the present invention. In particular, the method 200 updated probability adjustments in a corrective language model. The method 200 may be implemented, for example, by the system 100 illustrated in FIG. 1. As such, reference is made in the discussion of FIG. 2 to various elements of FIG. 1. It will be appreciated, however, that the method 200 is not limited to execution within a system configured exactly as illustrated in FIG. 1 and, may, in fact, execute within systems having alternative configurations.

The method 200 is initialized in step 202 and proceeds to step 204, where the input device 102 receives an input analog signal. As discussed above, the analog signal may be a speech sample, a textual input, or another type of signal.

In optional step 206 (illustrated in phantom), the preprocessor 104 processes the digital form of the input analog signal in accordance with one or more preprocessing techniques, such as noise reduction, endpointing, or the like.

In step 208, the HLT processor 106 processes the internal data describing the input signal (which may or may not have been preprocessed) in accordance with one or more HLT-based techniques. For example, the HLT processor 106 may perform ASR processing of the speech sample, or may translate the speech sample from a first language into a second language. Processing of the internal data in accordance with step 208 involves the application of at least one of the plurality of language models 110. In one embodiment, one statistical language model and the corrective language model are applied in combination (i.e., substantially simultaneously) to the internal data. The corrective language model may be specific to the user from whom the internal data was obtained. In this embodiment, the statistical language model and the corrective language model are combined to generate a joint score for the processing results produced by the HLT processor 106. In one embodiment, the statistical language model and the corrective language model are linearly combined in the logarithmic domain, so that normalization of the language models is unnecessary.

In step 210, the output device 112 outputs the processing result produced by the HLT processor 106. The output device 112 may deliver the processing result directly to a user, or the output device 112 may deliver the result to another system that utilizes the processing result for further operations.

In step 212, the input device 102 receives user feedback responsive to the processing result. The user feedback may comprise, for example, error corrections. For instance, if the processing result is a textual transcription of the speech sample, the error correction may comprises corrections to one or more words in the processing result. As an example, the textual translation may read "kiss this guy," while the actual speech sample said "kiss the sky."

In step 214, the language model adjuster 108 computes a probability adjustment for one or more words in the statistical language models, based on the user feedback. In one embodiment, the probability adjustment comprises a pre-defined amount of adjustment (e.g., x percent in a given direction). In one embodiment, the language model adjuster computes a probability adjustment for both the "correct" word and the "incorrect" word. For instance, a first adjustment may increase the probability of the correct word, and a second adjustment may decrease the probability of the incorrect word. Thus, referring back to the example above, the first adjustment may increase the probability of the word "sky," while the second adjustment decreases the probability of the word "guy." The language model adjuster 108 then stores the adjustments in the corrective language model (which is one of the plurality of language models 110) in step 216.

In step 218, the HLT processor 106 determines whether the internal data should be reprocessed. For example, if the user feedback received in step 212 indicates a correction to the processing result, the HLT processor 106 may reprocess the internal data, this time using one or more statistical language models in combination with the newly updated corrective language model as discussed above.

If the HLT processor 106 concludes in step 218 that the internal data should be reprocessed, the method 200 returns to step 208 and proceeds as described above. Alternatively, if the HLT processor 106 concludes in step 218 that the internal data should not be reprocessed, the method 200 terminate sin step 220.

As discussed above, the user feedback including error corrections is used to update a corrective language model that is separate from the standard statistical language models used by many HLT-based applications. When the corrective language model is used in combination with the statistical language models, the overall output quality may be improved (e.g., may contain less errors) without altering the original statistical language models. Since an individual user is unlikely to make a large number of corrections, the size of the corrective language model for the user is likely to be small relative to the standard statistical language models. Thus, the approach described above is space efficient, can be flexibly configured and applied for multiple users, and requires little computational overhead.

In some embodiments, use of the corrective language model is restricted to specific situations. For example, if the system 100 is unfamiliar with the lexical or semantic context of the input signal, the corrective language model may not be used. Alternatively, if the system 100 is having difficulty understanding the input signal, the corrective language model may help improve the system's understanding, and, consequently, output.

Adjustments to the probabilities of words in the statistical language models may be larger when the semantic context is known than when the semantic context is unknown. In addition, the sensitivity of the system 100 (and of the language model adjuster 18) may be tuned by the user.

Figure 3:
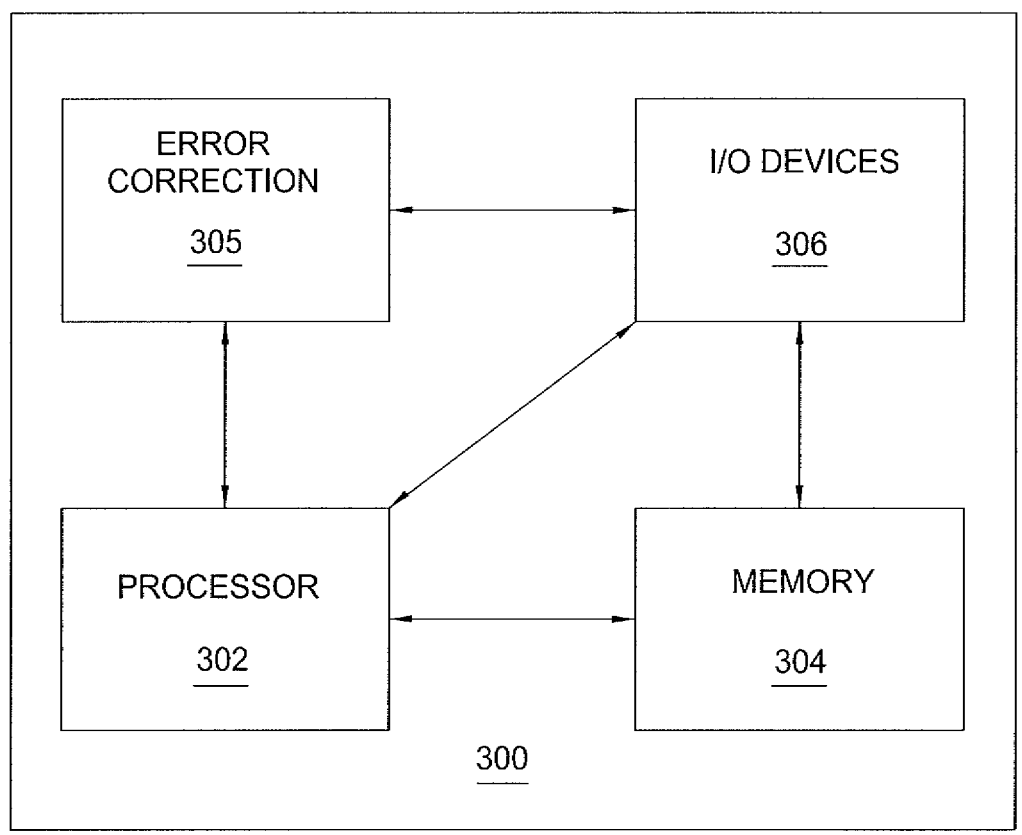
FIG. 3 is a high level block diagram of the present invention implemented using a general purpose computing device.

FIG. 3 is a high level block diagram of the present invention implemented using a general purpose computing device 300. It should be understood that embodiments of the invention can be implemented as a physical device or subsystem that is coupled to a processor through a communication channel. Therefore, in one embodiment, a general purpose computing device 300 comprises a processor 302, a memory 304, an error correction module 305, and various input/output (I/O) devices 306 such as a display, a keyboard, a mouse, a modem, a microphone, speakers, a touch screen, and the like. In one embodiment, at least one I/O device is a storage device (e.g., a disk drive, an optical disk drive, a floppy disk drive).

Alternatively, embodiments of the present invention (e.g., error correction module 305) can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the error correction module 305 for adapting a language model in response to error correction described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for processing an audio input speech signal including human language, the method comprising:
receiving the audio input speech signal;
applying, using a processor, a statistical language model combined with a separate, corrective language model to the audio input speech signal in order to produce a processing result;
outputting the processing result, wherein the processing result comprises a transformation of the audio input speech signal into text;
receiving user feedback responsive to the processing result, wherein the user feedback comprises a correction that substitutes a correct word for an incorrect word contained in the processing result; and
updating the corrective language model in accordance with the user feedback.

2. The method of claim 1, wherein the updating is performed without altering the statistical language model.

3. The method of claim 1, further comprising:
updating the corrective language model to reflect an increased probability associated with the correct word.

4. The method of claim 3, wherein an amount by which the probability is increased is dependent on a semantic context of the audio input speech signal.

5. The method of claim 3, wherein an amount by which the probability is increased is adjustable by a user from whom the user feedback is received.

6. The method of claim 1, further comprising:
updating the corrective language model to reflect a decreased probability associated with the incorrect word.

7. The method of claim 6, wherein an amount by which the probability is decreased is dependent on a semantic context of the audio input speech signal.

8. The method of claim 6, wherein an amount by which the probability is decreased is adjustable by a user from whom the user feedback is received.

9. The method of claim 1, wherein the applying comprises:
processing the audio input speech signal in accordance with a human language technology application.

10. The method of claim 9, wherein the human language technology application is automatic speech recognition.

11. The method of claim 9, wherein the human language technology application is machine translation.

12. The method of claim 1, wherein the applying comprises:
combining the statistical language model and the corrective language model without performing normalization of the statistical language model or the corrective language model.

13. The method of claim 12, wherein the combining comprises:
combining the statistical language model and the corrective language model linearly in a logarithmic domain.

14. The method of claim 1, wherein the corrective language model stores an adjustment to a probability associated with a word in the statistical language model.

15. The method of claim 1, wherein the corrective language model is specific to a user from whom the audio input speech signal is received.

16. A computer readable storage device containing an executable program for processing an audio input speech signal including human language, where the program performs steps comprising:
receiving the audio input speech signal;
applying, using a processor, a statistical language model combined with a separate, corrective language model to the audio input speech signal in order to produce a processing result;
outputting the processing result, wherein the processing result comprises a transformation of the audio input speech signal into text;
receiving user feedback responsive to the processing result, wherein the user feedback comprises a correction that substitutes a correct word for an incorrect word contained in the processing result; and updating the corrective language model in accordance with the user feedback.

17. A system for processing an audio input speech signal including human language, the system comprising:

an input device for receiving the audio input speech signal; and a processor for applying, using a processor, a statistical language model combined with a separate, corrective language model to the audio input speech signal in order to produce a processing result;

an output device for outputting the processing result, wherein the processing result comprises a transformation of the audio input speech signal into text, wherein the input device is further for receiving user feedback responsive to the processing result, wherein the user feedback comprises a correction that substitutes a correct word for an incorrect word contained in the processing result; and a language model adjuster for updating the corrective language model in accordance with the user feedback.

* * * * *